(12) United States Patent
Wolfe, Jr. et al.

(10) Patent No.: US 11,246,293 B2
(45) Date of Patent: Feb. 15, 2022

(54) TREAT DISPENSER WITH MULTI-POSITION RECESS

(71) Applicant: Starmark Pet Products, Inc., Hutto, TX (US)

(72) Inventors: Jerry J. Wolfe, Jr., Hutto, TX (US); Harold Keith Benson, Hutto, TX (US)

(73) Assignee: STARMARK PET PRODUCTS, INC., Hutto, TX (US)

( * ) Notice: Subject to any disclaimer, the term of this patent is extended or adjusted under 35 U.S.C. 154(b) by 229 days.

(21) Appl. No.: 16/353,603

(22) Filed: Mar. 14, 2019

(65) Prior Publication Data

US 2020/0288672 A1 Sep. 17, 2020

(51) Int. Cl.
*A01K 15/02* (2006.01)
*A01K 5/00* (2006.01)

(52) U.S. Cl.
CPC .............. *A01K 15/026* (2013.01); *A01K 5/00* (2013.01)

(58) Field of Classification Search
CPC .. A01K 15/026; A01K 15/025; A01K 5/0144; A01K 15/021; A01K 5/02; A01K 15/02
USPC ........................................................ 119/710
See application file for complete search history.

(56) References Cited

U.S. PATENT DOCUMENTS

| | | |
|---|---|---|
| 547,764 A | 10/1895 | Boyum |
| 563,170 A | 6/1896 | Haley et al. |
| 2,115,405 A | 4/1938 | Allen |
| 2,187,493 A | 1/1940 | Gordon |
| 2,269,941 A | 1/1942 | Jones |
| 3,072,938 A | 1/1963 | Phaneuf |
| 3,315,640 A | 4/1967 | Gamble |
| 3,450,592 A | 6/1969 | Conrad et al. |
| 3,597,874 A | 8/1971 | Ogsbury et al. |
| 3,694,954 A | 10/1972 | Brumlik |
| 3,808,737 A | 5/1974 | Abrams |
| 3,847,305 A | 11/1974 | Tobin |
| 4,153,248 A | 5/1979 | Holmes et al. |
| 4,170,106 A | 10/1979 | Koslosky |
| 4,240,412 A | 12/1980 | James |
| 4,309,038 A | 1/1982 | Spoon |
| 5,199,716 A | 4/1993 | DeFluiter et al. |
| RE34,352 E | 8/1993 | Markham et al. |
| 5,269,261 A | 12/1993 | McCance |
| 5,318,470 A | 6/1994 | Denny |
| 5,343,828 A | 9/1994 | Houghton et al. |
| 5,819,690 A * | 10/1998 | Brown ................ A01K 5/0114 119/707 |
| 5,832,877 A | 11/1998 | Markham |

(Continued)

FOREIGN PATENT DOCUMENTS

| | | |
|---|---|---|
| AU | 7493887 | 1/1988 |
| BE | 890561 | 1/1982 |

(Continued)

*Primary Examiner* — Brady W Frazier
*Assistant Examiner* — Zoe Tam Tran
(74) *Attorney, Agent, or Firm* — Brian F. Russell

(57) ABSTRACT

A treat dispenser includes a body having an exterior surface and a recess in the body. The recess has an outlet and is defined by interior surface having first and second lips protruding into the recess. The first lip defines a first treat-holding position having a first depth relative to the outlet, and the second lip defines a second treat-holding position having a greater second depth relative to the outlet.

11 Claims, 9 Drawing Sheets

(56) References Cited

U.S. PATENT DOCUMENTS

| | | | | |
|---|---|---|---|---|
| 5,865,146 | A | 2/1999 | Markham | |
| 5,870,971 | A | 2/1999 | Krietzman et al. | |
| 5,947,061 | A | 9/1999 | Markham et al. | |
| 6,076,486 | A | 6/2000 | Oliano | |
| 6,109,210 | A | 8/2000 | Nasser | |
| 6,116,191 | A | 9/2000 | Suchowski et al. | |
| D439,378 | S | 3/2001 | Loomis | |
| 6,217,408 | B1 | 4/2001 | Willinger | |
| 6,237,538 | B1 | 5/2001 | Tsengas | |
| 6,264,522 | B1 | 6/2001 | Dickson | |
| 6,386,540 | B1 | 5/2002 | Stevkovski | |
| 6,427,634 | B1 | 8/2002 | Mann | |
| 6,439,166 | B1 | 8/2002 | Markham | |
| 6,443,863 | B1 | 9/2002 | Dinoffer | |
| D473,348 | S | 4/2003 | Lang | |
| 6,550,426 | B2 | 4/2003 | Tsengas | |
| D475,766 | S | 6/2003 | Tolosa | |
| 6,579,145 | B1 | 6/2003 | Maxim | |
| 6,626,727 | B2 | 9/2003 | Balanchi | |
| 6,634,318 | B1 | 10/2003 | Rucker | |
| 6,669,526 | B2 | 12/2003 | Manville et al. | |
| 6,688,258 | B1 | 2/2004 | Kolesar | |
| D487,327 | S | 3/2004 | Anderson et al. | |
| 6,846,216 | B1 | 1/2005 | Balanchi | |
| D501,520 | S | 2/2005 | Fraze | |
| D503,954 | S | 4/2005 | Balanchi | |
| 6,941,895 | B2 | 9/2005 | St. Pierre | |
| 6,983,722 | B2 | 1/2006 | Tepper et al. | |
| 7,063,044 | B2 | 6/2006 | Handlesman et al. | |
| D535,068 | S | 1/2007 | Renforth | |
| D536,506 | S | 2/2007 | Unlu | |
| D544,655 | S | 6/2007 | Hass | |
| D545,510 | S | 6/2007 | Viola | |
| 7,246,574 | B2 | 7/2007 | Renforth | |
| 7,270,085 | B2 | 9/2007 | Wolfe, Jr. et al. | |
| 7,278,374 | B2 | 10/2007 | Mann | |
| D554,811 | S | 11/2007 | Rutherford | |
| D556,392 | S | 11/2007 | Rutherford et al. | |
| D556,393 | S | 11/2007 | Rutherford et al. | |
| D563,493 | S | 3/2008 | Nelson et al. | |
| 7,389,748 | B2 | 6/2008 | Shatoff et al. | |
| D582,998 | S | 12/2008 | Chernick et al. | |
| D585,162 | S | 1/2009 | Partain et al. | |
| 7,555,997 | B2 | 7/2009 | Wolfe, Jr. et al. | |
| 7,600,488 | B2 | 10/2009 | Mann | |
| 7,647,894 | B2 | 1/2010 | Axelrod et al. | |
| D614,365 | S | 4/2010 | Watson et al. | |
| D617,395 | S | 6/2010 | Colangelo et al. | |
| 7,789,727 | B2 | 9/2010 | Chernick et al. | |
| 7,806,086 | B2 | 10/2010 | Ottosson | |
| 7,819,086 | B2 | 10/2010 | Woltmann et al. | |
| D629,056 | S | 12/2010 | Grimm | |
| 7,866,281 | B2 * | 1/2011 | Willinger | A01K 5/0114 119/710 |
| D634,507 | S | 3/2011 | Lawrenson | |
| D642,342 | S | 7/2011 | Shatoff et al. | |
| D650,536 | S | 12/2011 | Oblack et al. | |
| 8,087,387 | B2 | 1/2012 | Gamble et al. | |
| D655,461 | S | 3/2012 | Ragonetti | |
| D660,664 | S | 5/2012 | Hsu | |
| D660,665 | S | 5/2012 | Hsu | |
| 8,225,747 | B2 | 7/2012 | Markham et al. | |
| 8,240,273 | B2 | 8/2012 | Benson | |
| D676,090 | S | 2/2013 | Rottje | |
| 8,464,666 | B2 * | 6/2013 | Chefetz | A01K 29/00 119/709 |
| 8,474,404 | B2 | 7/2013 | Costello | |
| D687,954 | S | 8/2013 | Dallman | |
| D688,027 | S | 8/2013 | Smith et al. | |
| 8,550,868 | B2 | 10/2013 | Kwak et al. | |
| 8,584,620 | B2 * | 11/2013 | Rutherford | A01K 15/025 119/707 |
| 8,640,647 | B2 * | 2/2014 | Dotterer | A01K 5/0114 119/51.01 |
| D700,755 | S | 3/2014 | Reiss et al. | |
| 9,107,390 | B1 * | 8/2015 | Day | A01K 15/026 |
| 2001/0029904 | A1 | 10/2001 | Viola | |
| 2002/0151248 | A1 | 10/2002 | Hsu | |
| 2002/0174838 | A1 | 11/2002 | Crane | |
| 2005/0120972 | A1 * | 6/2005 | Aboujaoude | A01K 15/025 119/707 |
| 2006/0048718 | A1 * | 3/2006 | Mann | A01K 15/026 119/710 |
| 2006/0231039 | A1 | 10/2006 | Abinanti et al. | |
| 2007/0006818 | A1 * | 1/2007 | Bidinger | A01K 15/026 119/709 |
| 2007/0068464 | A1 * | 3/2007 | Smith | A01K 15/025 119/709 |
| 2007/0190892 | A1 | 8/2007 | Manvelian | |
| 2007/0289553 | A1 * | 12/2007 | Jager | A01K 15/026 119/710 |
| 2008/0121190 | A1 | 5/2008 | Moulton | |
| 2008/0178821 | A1 | 7/2008 | Lamstein | |
| 2009/0314221 | A1 * | 12/2009 | Wang | A01K 15/025 119/707 |
| 2010/0179593 | A1 | 7/2010 | Lamar | |
| 2011/0028063 | A1 | 2/2011 | Colangelo et al. | |
| 2011/0139815 | A1 * | 6/2011 | Benson | A01K 5/0114 119/51.01 |
| 2012/0272922 | A1 | 11/2012 | Axelrod et al. | |
| 2013/0247836 | A1 | 9/2013 | Axelrod et al. | |
| 2014/0261195 | A1 | 9/2014 | Reiss et al. | |
| 2014/0270931 | A1 * | 9/2014 | Jager | A01K 15/025 403/343 |
| 2015/0128875 | A1 | 5/2015 | Christianson et al. | |
| 2015/0342145 | A1 | 12/2015 | Christianson et al. | |
| 2016/0081305 | A1 * | 3/2016 | Williams | A01K 15/025 119/709 |
| 2017/0118957 | A1 * | 5/2017 | Nunn | A01K 15/025 |
| 2017/0303509 | A1 * | 10/2017 | Stone | A01K 5/00 |

FOREIGN PATENT DOCUMENTS

| | | |
|---|---|---|
| CN | 201692659 | 1/2011 |
| DE | 29821473 | 4/1999 |
| DE | 60312739 | 12/2007 |
| IT | RM20040362 | 10/2004 |
| JP | 5955328 | 7/2016 |
| SE | 524095 | 6/2004 |
| WO | 2000041560 | 7/2000 |
| WO | 2005076901 | 8/2005 |

* cited by examiner

TREAT DISPENSER WITH MULTI-POSITION RECESS

BACKGROUND OF THE INVENTION

The present invention relates to a treat dispenser, and more particularly, to a treat dispenser incorporating a recess configured to hold a treat in one of multiple positions.

Treat dispensers are commonly provided to animals, such as dogs, to supply nutrition, to promote dental cleaning, to provide healthy physical exercise and mental stimulation, and to reduce destructive behaviors arising from boredom. A number of different treat dispensing pet toys that hold and/or dispense treats have been patented and/or introduced into the pet toy market in recent years.

For example, U.S. Patent Application Publication No. USB 20160165845A1 discloses a treat dispensing pet toy including a plurality of treat dispensing openings or holes, and a plurality of chambers within the treat dispensing pet toy separated by respective internal partitions. Each chamber may be loaded with desired types of treats. The size, shape, and number of treat dispensing openings may differ between openings that communicate with respective chambers. The different sized and shaped treat dispensing openings, as well as the number of openings in the device, provide different levels of difficulty for treat extraction.

U.S. Patent Application Publication No. 20150101546 A1 discloses a pet toy with a treat holding receptacle. The receptacle has a plurality of interior engaging surfaces that fictionally hold a primary treat in a desired orientation. An opening is formed through the receptacle for loading secondary treats into an interior of the pet toy. The primary treat has an exposed portion shaped and sized to provide a desired degree of difficulty for an animal to remove the primary treat from the corresponding receptacle. The portion of the primary treat in contact with the engaging surfaces of the receptacle forms a cap or closure, and when all or part of the primary treat is removed, the secondary treats may be dispensed through the opening of the receptacle.

U.S. Pat. No. 7,555,997 discloses a container having an exterior feature for holding treats by a peripheral lip that surrounds and overlaps a corresponding peripheral edge of a first treat, and an interior open space that may be used to hold additional treats. The first treat blocks access to the interior open space.

U.S. Pat. No. 7,500,450 discloses a toy with a hollow interior, a first edible treat that blocks access to the interior, and a second edible treat that interlocks with the first edible treat, the second edible treat extending into the interior of the toy. Additional treats may be placed within the hollow interior.

U.S. Pat. No. 6,129,053 discloses a pet toy having an outer surface with one or more recesses for holding treats. The recesses may be of varying depths and shapes to receive different types of treats. Some of the recesses may extend completely through the sidewall of the toy.

These and other similar pet toys seek to incentive an animal's extended interaction with the pet toy by dispensing treats over a relatively long time interval. However, in practice, an extended interval of animal interaction with the toy may not be achieved for some pet toys, for example, because the pet toy dispenses treats too rapidly to the pet or because the pet toy makes it too difficult for the pet to obtain sufficient treats from the pet toy. In either case, the pet will become disinterested in the pet toy.

BRIEF SUMMARY

In at least one embodiment, a treat dispenser encourages extended pet interaction by providing a recess including multiple treat-retaining features corresponding to differing levels of difficulty in extracting a treat from the treat dispenser.

In at least one embodiment, a treat dispenser includes a body having an exterior surface and a recess in the body. The recess has an outlet and is defined by an interior surface having first and second lips protruding into the recess. The first lip defines a first treat-holding position having a first depth relative to the outlet, and the second lip defines a second treat-holding position having a greater second depth relative to the outlet.

In at least one embodiment of the treat dispenser, the body includes a treat-holding cavity that communicates with the recess via an opening.

In at least one embodiment, the treat dispenser includes a plurality of flexible flaps separating the cavity and the recess.

In at least one embodiment, the treat dispenser has an opening in the body that communicates between the cavity and an exterior surface of the treat dispenser, for example, to permit a treat to be placed into the cavity other than through the recess.

In some embodiments, the outlet of the recess is recessed within a surrounding portion of the exterior surface. In other embodiments, the outlet extends outwardly from a surrounding portion of the exterior surface.

In at least one embodiment, the first lip is continuous about the recess and the second lip is continuous about the recess.

In some embodiments, the recess has a first interior dimension at the first lip, and the recess has a lesser second interior dimension at the second lip. In other embodiments, the recess has an equal or greater second interior dimension at the second lip.

In at least some embodiments, the first lip and second lip together form a continuous helix.

DETAILED DESCRIPTION

Figure 1:
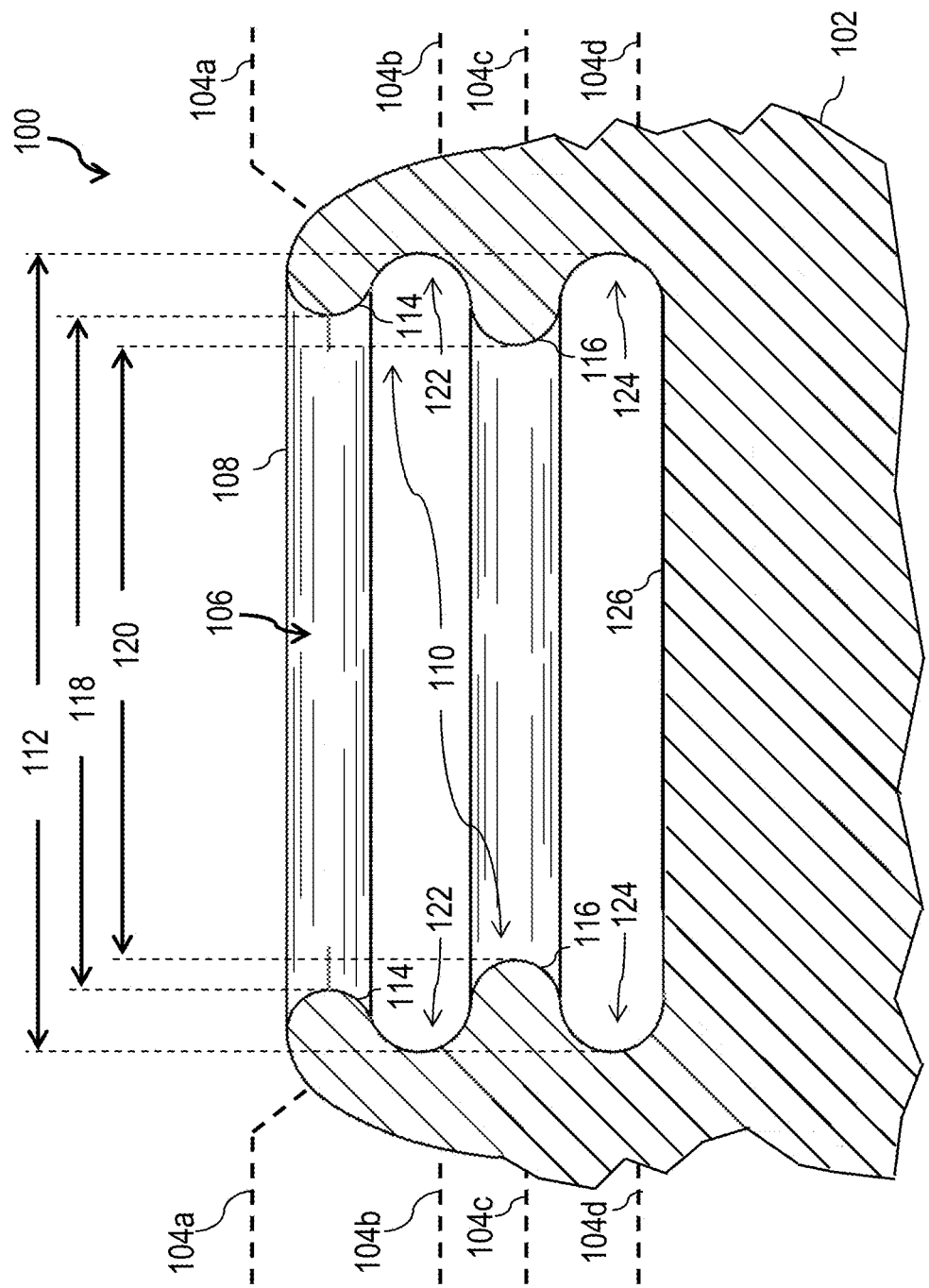
FIGS. 1-4 illustrate section views of a first treat dispenser in accordance with one or more embodiments.

With reference now to the figures and with particular reference to FIGS. 1-4, there are illustrated section views of a first treat dispenser 100 in accordance with one or more embodiments. Treat dispenser 100 includes a body 102 that is partially illustrated in FIGS. 1-4. Body 102 can have any desired overall form, including, without limitation, that of a ball, a bone, a stick, an animal or human food item (e.g., a steak, a chicken leg, a donuts, etc.), a geometric form (e.g., a sphere, a pyramid, a cube, a star, etc.), and/or an irregular form. Body 102 is preferably made of a resilient elastomeric material, such as a thermoplastic elastomer or natural rubber, which has sufficient durability to withstand the repeated biting action of an animal without tearing or permanent deformation. Body 102 can be made, for example, by injection molding.

Body 102 has an exterior surface, which in the various different embodiments can have different profiles and/or contours and/or surface finishes. For example, in in first embodiment, body 102 can have an exterior surface 104*a*, in a second embodiment, body 102 can have an exterior surface 104b, in a third embodiment, body 102 can have an exterior surface 104c, and in a fourth embodiment, body 102 can have an exterior surface 104d.

In each of the various different embodiments depicted in FIGS. 1-4, a recess 106 is formed in body 102. Recess 106 has an outlet 108 at which recess 106 communicates with an exterior of treat dispenser 100 and is a defined by an interior surface 110 of body 102. In the illustrated embodiments, recess 106 has an ovoid or circular bore having a maximum internal dimension 112. In other embodiments, recess 106 can have a rectangular, triangular, irregular, or other shape of bore when viewed in plan. As made clear in the following discussion, the shape of bore is preferably selected to accommodate and correspond to a treat 200 to be dispensed by treat dispenser 100.

At least a first lip 114 and a second lip 116 project or protrude into the bore of recess 106. In some embodiments, like those illustrated in FIGS. 1-4, first lip 114 and second lip 116 are continuous about a periphery of recess 106. In other embodiments, at least one of first lip 114 and second lip 116 is not continuous about a periphery of recess 106, but is instead discontinuous and includes multiple different segments. In yet other embodiments, first lip 114 and second lip 116 are continuous with one another such they together form a helix-like form on interior surface 110 of body 102.

In some embodiments, first lip 114 and second lip 116 protrude equally into the bore of recess 106. In other embodiments, first lip 114 protrudes a lesser or greater distance into recess 106 than second lip 116. For example, in the embodiment shown in FIGS. 1-4, first lip 114 projects a lesser distance into recess 106 than second lip 116. As a consequence, a dimension 118 across recess 106 between the maximum extension of first lip 114 is greater than a dimension 120 across recess 106 between the maximum extension of second lip 116. In other embodiments, first lip 114 projects a greater distance into recess 106 than second lip 116, resulting in dimension 118 being less than dimension 120.

Figure 2:
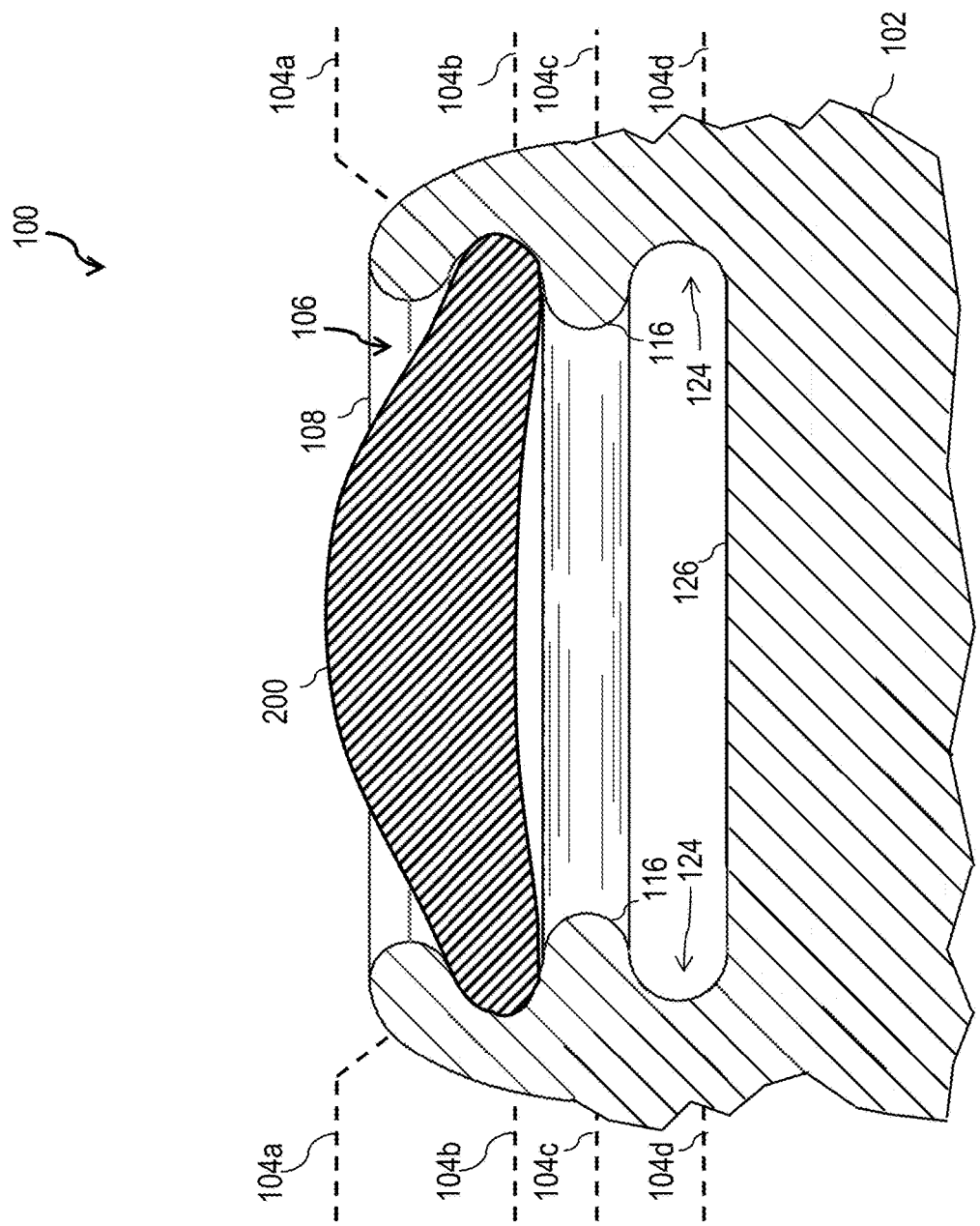
Figure 3:
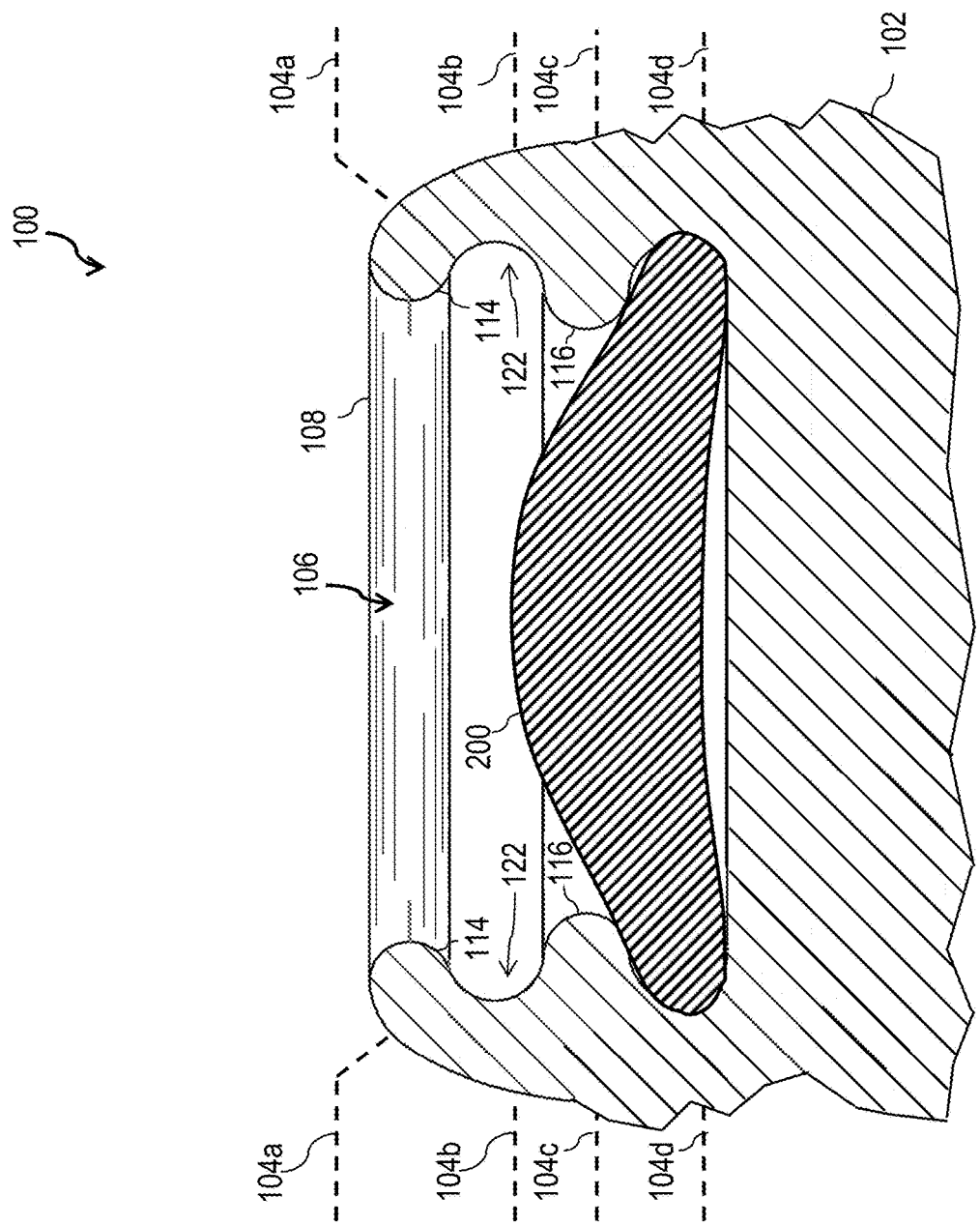
Figure 4:
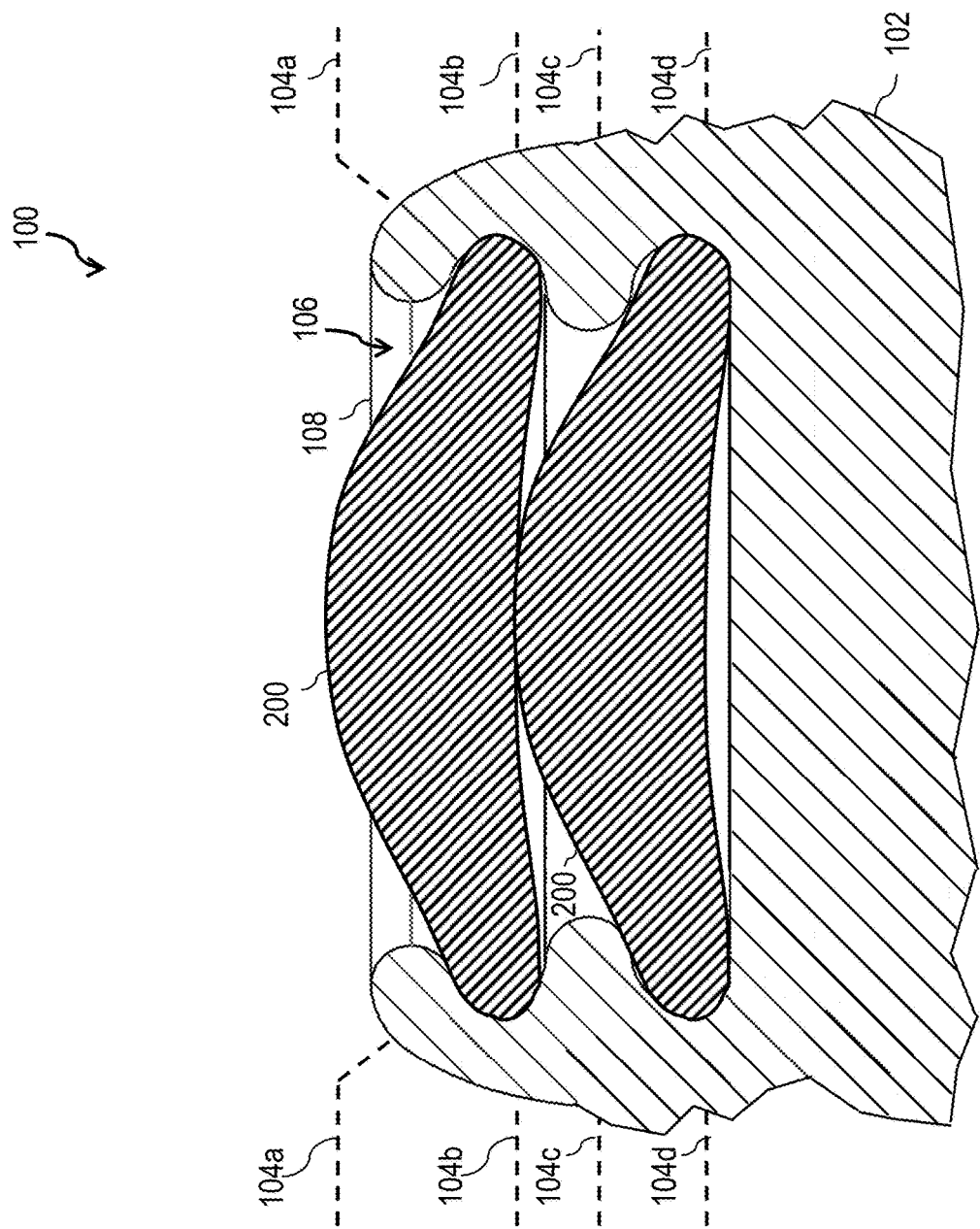

The space between first lip 114 and second lip 116 forms a first inset 122 providing a first treat-holding position for holding a treat 200, as seen in FIGS. 2 and 4. A similar second treat-holding position for holding a treat 200 between second lip 116 and a base 126 of recess 106 is provided by a second inset 124. As will be appreciated, the relative difficulty in extracting a given treat 200 from the first treat-holding position and second treat-holding position can be selected, for example, by varying the dimension 112 of recess 106, dimensions 118 and 120 of lips 114 and 116, the dimensions of insets 122 and 124, and/or the depths of the first and second treat-holding positions relative to outlet 108. For example, in the embodiment depicted in FIGS. 1-4, a treat 200 is relatively easier to extract from the first threat-holding position than the second threat-holding position because dimension 118 is greater than corresponding dimension 120 and because the first treat-holding position is at a lesser depth relative to outlet 108 than the second treat-holding position. In one specific example, dimension 118 is between 3-10 mm greater, and more particularly, about 5 mm greater than dimension 120. In other embodiments, extraction of a treat 200 from the second treat-holding position can be made approximately as easy as or even easier than extraction of a treat 200 from the first treat-holding position, for example, by decreasing dimension 118 and/or increasing dimension 120.

In one or more embodiments, treats 200 can be rigid or semi-rigid and can be formed, for example, by injection molding, as is known in the art. It is preferred if treats 200 are digestible by an animal and provide nutrition as well as a desirable flavor. In preferred embodiments, treats 200 have dimensions compatible with the selected dimensions of recess 106 and insets 122, 124. For example, in some embodiments, treats 200 can have a maximum dimension approximately the same as (e.g., plus or minus 10% of) dimension 112 of bore 106. Further, in at least some embodiments, different sizes of treats 200 can be utilized in a given one of the treat-holding positions and/or between different treat-holding positions in order to achieve a desired level of difficulty in extracting treats from the treat-holding position(s).

As shown in FIG. 2, a treat 200 can be installed into the first treat-holding position by inserting treat 200 into outlet 108 of recess 106 and then using manual force to move a periphery of the treat 200 past first lip 114 (which will resiliently deform downwardly and outwardly) and into first inset (recess) 122. If desired, additional manual force can be applied to treat 200 to force the periphery of treat 200 past second lip 116 into second recess 124, as shown in FIG. 3. In at least some embodiments like that shown in FIG. 4, recess 106 and treats 200 are designed to permit recess 106 to concurrently hold treats 200 in both the first and second treat-holding positions. As shown in FIGS. 2-4, once installed in the first and/or second treat-holding positions, a treat 200 is retained within recess 106 by the overlap of first lip 114 or second lip 116 with a peripheral portion of the treat 200 and/or frictional engagement of the treat 200 by interior surface 110. Although not required, in some embodiments, a treat 200 installed in one or more of the first and second treat-holding positions extends outwardly beyond outlet 108 to encourage animal interaction with treat dispenser 100 and/or to facilitate extraction of treat 200 from treat dispenser 100. For example, in the example given in FIGS. 2 and 4, a portion of a treat 200 installed in the first treat-holding position extends outwardly beyond outlet 108.

Figure 6:
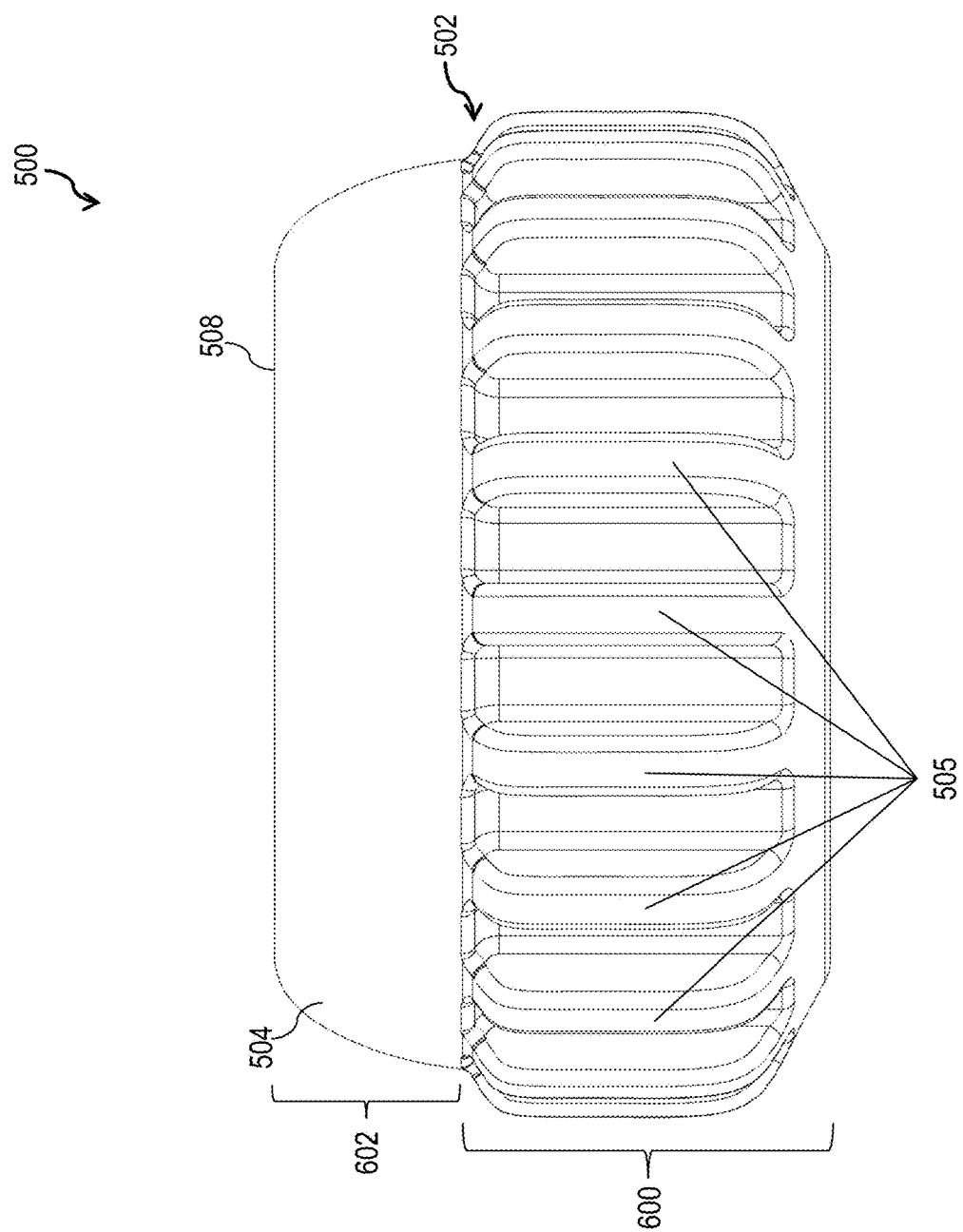
Figure 7:
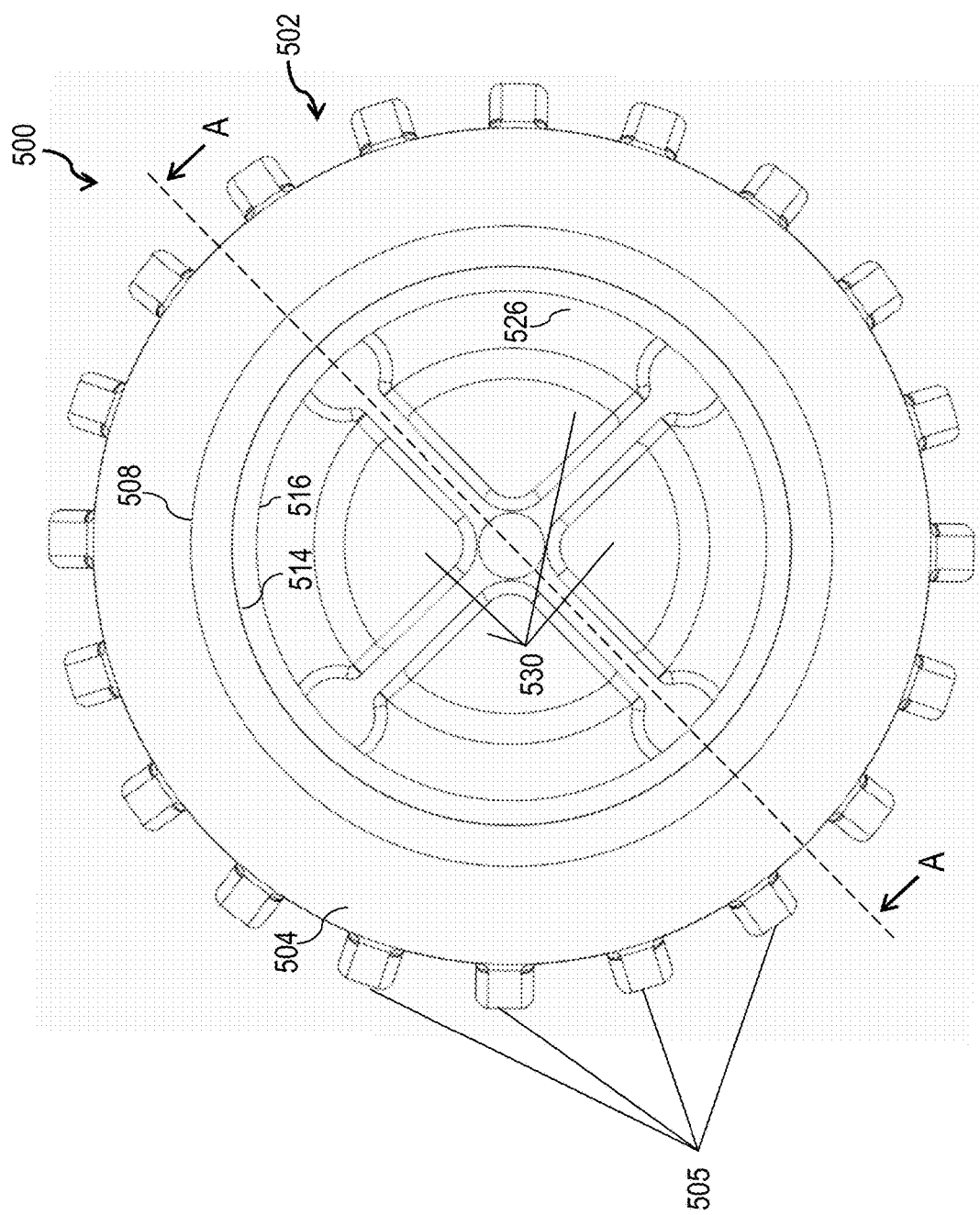
Figure 8:
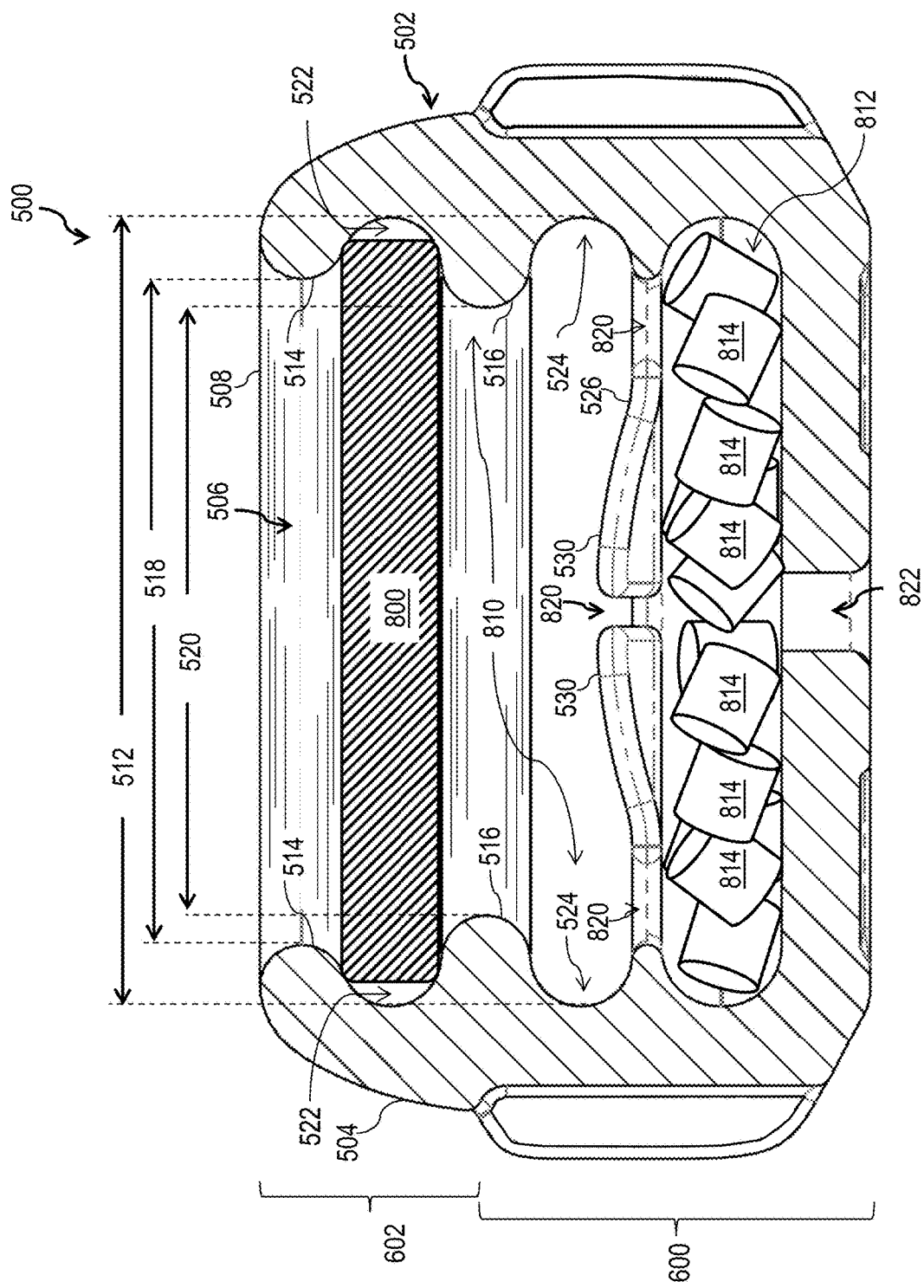
Figure 9:
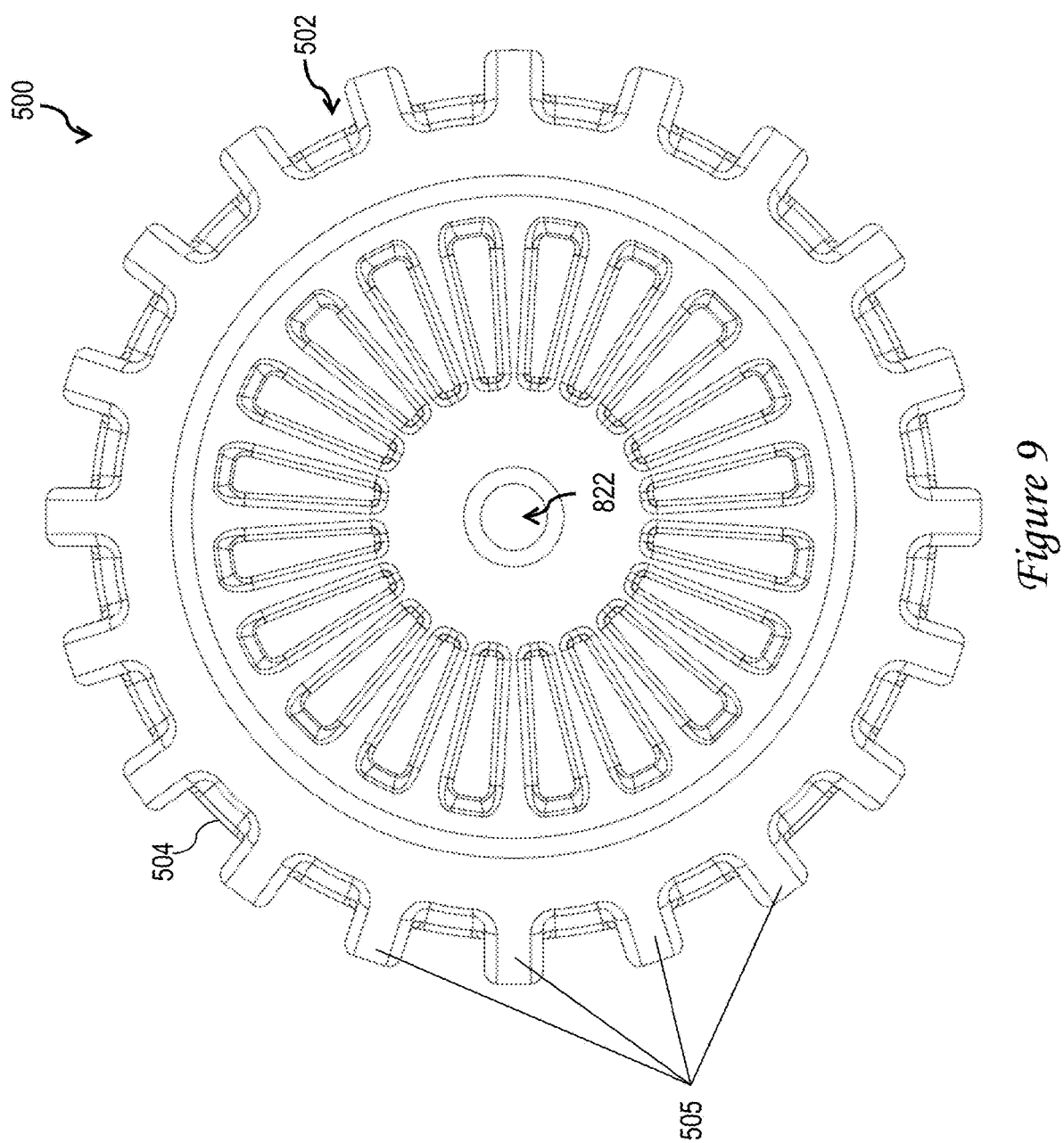

Referring now to FIGS. 5-9, there are depicted top perspective, side elevation, top plan, section, and bottom plan views, respectively, of a second treat dispenser 500 in accordance with one or more embodiments. The section view given in FIG. 8 is taken along line A-A in FIG. 7.

In this example, treat dispenser 500 includes a unitary body 502 having an exterior surface 504. As best seen in FIGS. 6 and 8, in this example, body 502 includes a first portion 600 that resembles a wheel or sprocket (given the appearance of teeth 505 distributed about the circumference of first portion 600) and a second portion 602 having the general form of a truncated dome 600 that extends from one side of first portion 600. As with treat dispenser 100, treat dispenser 500 is preferably made of a resilient elastomeric material by injection molding.

A recess 506 is formed in body 502. Recess 506 has an outlet 508 at which recess 506 communicates with an exterior of treat dispenser 100 and is a defined by an interior surface 810 of body 502. In the illustrated embodiments, recess 506 has a substantially cylindrical bore having a maximum internal dimension 512. Into the bore of recess 506, a first lip 514 and a second lip 516 project or protrude. First lip 514 and second lip 516 are continuous about a periphery of recess 506. In the illustrated embodiment, first lip 514 protrudes a lesser distance into recess 506 than second lip 516, meaning that dimension 518, which the minimum diameter across recess 506 between opposing portions of first lip 514, is greater than dimension 520, which the minimum diameter across recess 506 between opposing portions of second lip 516.

The space between first lip 514 and second lip 516 forms a first inset 522 providing a first treat-holding position for holding a treat 800, as seen in FIG. 8. A similar second treat-holding position for holding a treat 800 between second lip 516 and a base 526 of recess 506 is provided by a second inset 524. In the embodiment depicted in FIGS. 5-9, a treat 800 is relatively easier to extract from the first threat-holding position than the second threat-holding position because dimension 518 is greater than corresponding dimension 520 and because the first treat-holding position is at a lesser depth relative to outlet 508 than the second treat-holding position.

In one or more embodiments, treats 800 can be rigid or semi-rigid and can be formed, for example, by injection molding from animal-digestible material providing both nutrition and a desirable flavor. In preferred embodiments, treats 800 have dimension compatible with the selected dimensions of recess 506 and insets 522, 524. For example, in the illustrated embodiment, treat 800 is sized to frictionally engage at least the upper and lower surfaces of first inset 522 when installed in the first threat-holding position. In this example, a surface of treat 800 facing outlet 508 is substantially planar and does not extend outwardly from outlet 508 when treat 800 is installed in the first treat-holding position provided by first inset 522.

Figure 5:
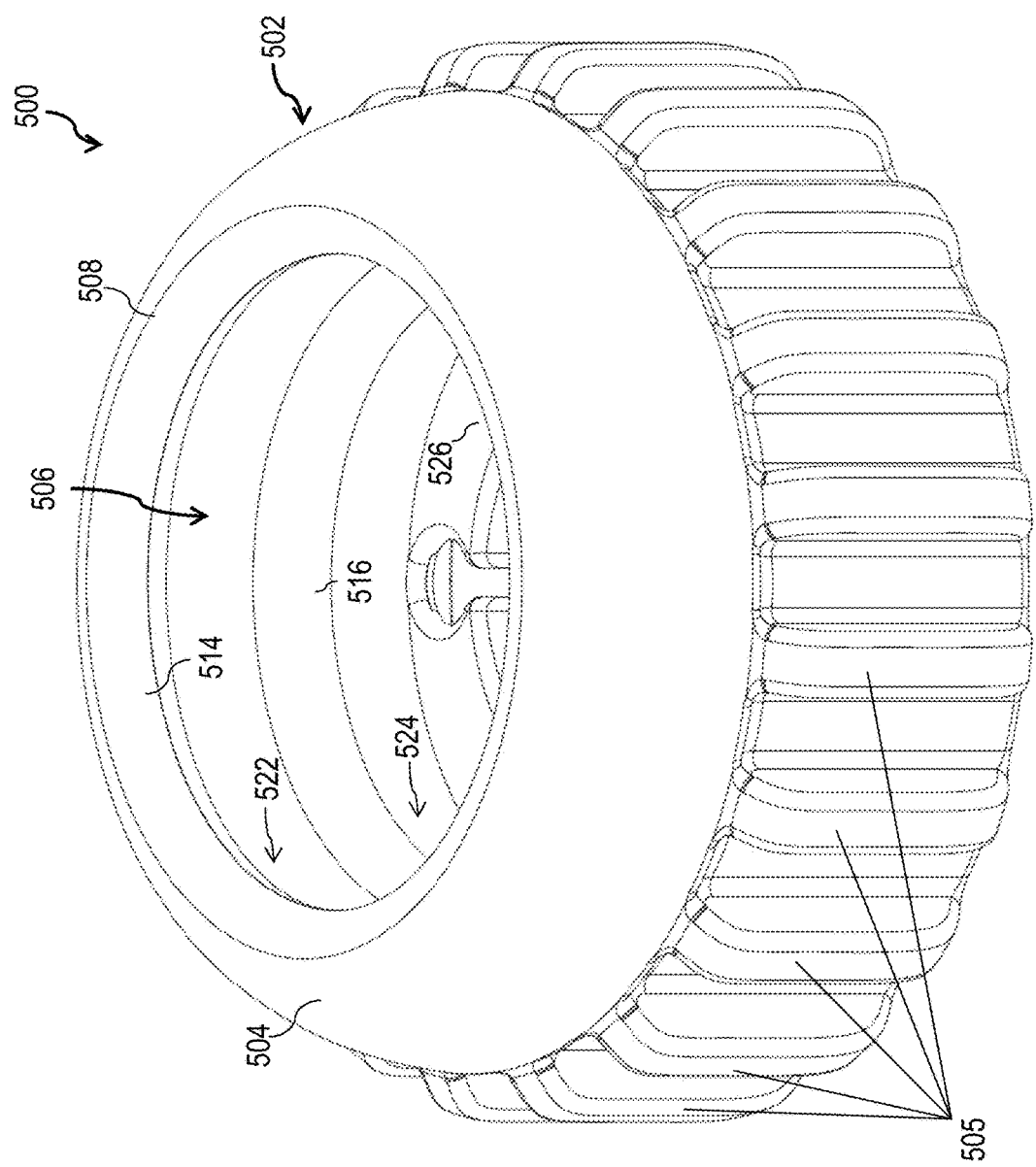
FIGS. 5-9 depict top perspective, side elevation, top plan, section, and bottom plan views of a second treat dispenser in accordance with one or more embodiments.

As further illustrated in FIGS. 5, 7, and 8, body 502 optionally includes a cavity 812 that is at least partially partitioned from recess 506 by base 526 of recess 506. Cavity 812 may be utilized to hold one or more discrete treats 814 and/or a fluid, gel, slurry, paste, mixture, or other non-discrete treat (not illustrated). Cavity 812 communicates with recess 506 via a first opening 820. The size of opening 820 is limited by (i.e., partially blocked by) a plurality of flexible flaps 530 extending from base 526. Flaps 530 serve to meter the rate at which treats 814 are dispensed from cavity 812 via recess 506 and outlet 508 after treat 800 is extracted. In some embodiments, body 502 optionally has a second opening 822 that communicates between exterior surface 504 and cavity 812. Second opening 822 can serve as an air hole that permits air to communicate with the interior of body 502 as body 502 is deformed by the biting and chewing action of an animal. Second opening 822, if present, can also permit a non-discrete treat to be loaded into cavity 812 even if a treat 800 is installed in one or both of the first and second treat-holding positions.

In use, a human user may optionally load one or more discrete treats 814 into cavity 812 via first opening 820. Alternatively or additionally, the user may optionally load a desired amount of a non-discrete treat through the first opening 820 and/or the second opening 822. The user may then install a treat 800 into the first treat-holding position by inserting treat 800 into outlet 508 of recess 506 and then using manual force to move a periphery of the treat 800 past first lip 514, which will resiliently deform downwardly and outwardly, and into first recess 122. The first lip 514 will then resiliently return to substantially its originally configuration. If desired, the user can apply additional manual force to treat 800 to force the periphery of treat 800 past second lip 516 into second recess 524. In at least some embodiments like that shown in FIGS. 5-9, recess 506 and treats 800 are designed to permit recess 506 to concurrently hold treats 800 in both the first and second treat-holding positions. The user may optionally load a desired amount of a non-discrete treat into cavity 812 via the second opening 822 following the installation of one or more treats 800 into cavity 506.

After the treat dispenser 500 is loaded with the desired treat(s), treat dispenser 500 is provided to an animal to interact with. The animal will then attempt, via chewing or otherwise deforming body 502, to dislodge and/or to consume treat 800. Once all treat(s) 800 are removed from recess 506 by the animal, treats installed in cavity 812, if any, are dispensed to the animal over time as the animal continues to interact with treat dispenser 500. Treat dispenser 500 may thereafter be reloaded with additional treats as desired.

As has been described, in at least one embodiment, a treat dispenser includes a body having an exterior surface and a recess in the body. The recess has an outlet and is defined by an interior surface having first and second lips protruding into the recess. The first lip defines a first treat-holding position having a first depth relative to the outlet, and the second lip defines a second treat-holding position having a greater second depth relative to the outlet.

While the present invention has been particularly shown as described with reference to one or more preferred embodiments, it will be understood by those skilled in the art that various changes in form and detail may be made therein without departing from the spirit and scope of the invention. Further, the term "coupled" as used herein is defined to encompass embodiments employing a direct connection between coupled elements, as well as embodiments employing an indirect connection between coupled elements achieved using one or more intervening elements or blocks. In addition, the term "exemplary" is defined herein as meaning one example of a feature, not necessarily the best or preferred example.

What is claimed is:

1. A treat dispenser, comprising:
   a body having an exterior surface;
   a continuous recess in the body, the recess having an outlet and being defined by an interior surface of the body and a base surface in the body, the interior surface having a first lip protruding into the recess, a second lip protruding into the recess, a first inset between the first and second lips, and a second inset between the second lip and the base surface, wherein:
   the first inset defines a first treat-holding position having a first depth relative to the outlet;
   the second inset defines a second treat-holding position having a greater second depth relative to the outlet than the first inset;
   the first lip is discontinuous with the second lip and the first inset is discontinuous with the second inset; and
   the recess has a first interior dimension at the first lip, a corresponding second interior dimension at the second lip, and a third interior dimension at each of the first and second treat-holding positions, wherein the first, second, and third dimensions differ from one another.

2. The treat dispenser of claim 1, wherein the outlet is recessed within a surrounding portion of the exterior surface.

3. The treat dispenser of claim 1, wherein the outlet extends outwardly from a surrounding portion of the exterior surface.

4. The treat dispenser of claim 1, wherein the first lip is continuous about the recess and the second lip is continuous about the recess.

5. The treat dispenser of claim 1, wherein the first interior dimension at the first lip is greater than the second interior dimension at the second lip.

6. The treat dispenser of claim 1, wherein the first interior dimension at the first lip is less than the second interior dimension at the second lip.

7. The treat dispenser of claim 1, and further comprising a treat frictionally engaged with the interior surface at opposing sides the first inset and disposed in the first treat-holding position.

8. A system, comprising:
- a treat dispenser, including:
  - a body having an exterior surface;
  - a continuous recess in the body, the recess having an outlet and being defined by an interior surface of the body and a base surface in the body, the interior surface having a first lip protruding into the recess, a second lip protruding into the recess, a first inset between the first and second lips, and a second inset between the second lip and the base surface, wherein:
    - the first inset defines a first treat-holding position having a first depth relative to the outlet;
    - the second inset defines a second treat-holding position having a greater second depth relative to the outlet than the first inset;
    - the first lip is discontinuous with the second lip and the first inset is discontinuous with the second inset;
    - the recess has a first interior dimension at the first lip, a corresponding second interior dimension at the second lip, and a third interior dimension at each of the first and second treat-holding positions, wherein the first, second, and third dimensions differ from one another; and
- a treat sized to be installed through the outlet into either of the first inset and the second inset and frictionally engaged with the interior surface at opposing sides of the recess within one of the first or second insets.

9. The system of claim 8, wherein the first lip is continuous about the recess and the second lip is continuous about the recess.

10. The system of claim 8, wherein the first interior dimension at the first lip is greater than the second interior dimension at the second lip.

11. The system of claim 8, wherein the first interior dimension at the first lip is less than the second interior dimension at the second lip.

\* \* \* \* \*